US007116765B2

(12) United States Patent
Summers et al.

(10) Patent No.: US 7,116,765 B2
(45) Date of Patent: Oct. 3, 2006

(54) MAPPING AN INTERNET DOCUMENT TO BE ACCESSED OVER A TELEPHONE SYSTEM

(75) Inventors: David L. Summers, Salt Lake City, UT (US); David L. Morton, Sandy, UT (US); Chimiao Xu, Salt Lake City, UT (US); Darren L. Wesemann, North Salt Lake, UT (US)

(73) Assignee: Intellisync Corporation, San Jose, CA (US)

( * ) Notice: Subject to any disclaimer, the term of this patent is extended or adjusted under 35 U.S.C. 154(b) by 457 days.

(21) Appl. No.: 09/854,308

(22) Filed: May 11, 2001

(65) Prior Publication Data

US 2001/0032234 A1    Oct. 18, 2001

Related U.S. Application Data

(63) Continuation-in-part of application No. 09/464,989, filed on Dec. 16, 1999.

(60) Provisional application No. 60/263,003, filed on Jan. 19, 2001.

(51) Int. Cl.
*H04M 1/64* (2006.01)
*H04M 3/42* (2006.01)

(52) U.S. Cl. .................. 379/88.17; 379/88.11; 379/88.12; 379/88.14; 379/88.16; 379/88.18; 379/201.01; 379/201.03; 379/67.1; 379/265.01; 379/265.09

(58) Field of Classification Search .......... 379/88.12, 379/88.13, 88.07, 88.17, 88.18, 900, 902, 379/908, 67.1, 88.11, 88.14, 88.16, 201.01, 379/265.01, 265.09; 370/400, 410, 420, 370/426; 704/270, 271, 275
See application file for complete search history.

(56) References Cited

U.S. PATENT DOCUMENTS 5,799,063 A      8/1998   Krane .................... 379/67
5,884,262 A *    3/1999   Wise et al. ............. 704/270.1

(Continued)

*Primary Examiner*—Allan Hoosain
(74) *Attorney, Agent, or Firm*—Workman Nydegger

(57) ABSTRACT

Methods and systems for enabling a user to create a user-defined map of an Internet document to control how text and links of the Internet document are presented to the user. A user selects and names regions of text or links of an Internet document to create a user-defined map. A user accesses a voice browser which provides an audio representation of the Internet document based on the user-defined map. Prompts assist a user in creating and navigating through the user-defined map. User requests cause an audio representation of the text or links associated with the user-defined map to be played to the user. When selected content associated with the user-defined map is modified then the updated content is provided to the user.

33 Claims, 8 Drawing Sheets

U.S. PATENT DOCUMENTS

| | | | |
|---|---|---|---|
| 5,905,508 A | 5/1999 | Beitel | 345/440 |
| 5,915,001 A * | 6/1999 | Uppaluru | 379/88.22 |
| 5,923,736 A * | 7/1999 | Shachar | 379/93.17 |
| 5,930,474 A | 7/1999 | Dunworth et al. | 395/200.47 |
| 5,953,392 A | 9/1999 | Rhie et al. | 379/88.13 |
| 6,018,710 A * | 1/2000 | Wynblatt et al. | 704/260 |
| 6,122,290 A | 9/2000 | Kawamata | 370/466 |
| 6,157,705 A | 12/2000 | Perrone | 379/88.01 |
| 6,169,997 B1 | 1/2001 | Papierniak et al. | 707/501 |
| 6,208,659 B1 * | 3/2001 | Govindarajan et al. | 370/410 |
| 6,279,015 B1 | 8/2001 | Fong et al. | 707/523 |
| 6,336,123 B1 | 1/2002 | Inoue et al. | 707/501.1 |
| 6,353,661 B1 * | 3/2002 | Bailey, III | 379/93.25 |
| 6,456,699 B1 * | 9/2002 | Burg et al. | 379/88.17 |
| 6,459,774 B1 * | 10/2002 | Ball et al. | 379/67.1 |
| 6,484,156 B1 * | 11/2002 | Gupta et al. | 707/1 |
| 6,496,692 B1 * | 12/2002 | Shanahan | 455/418 |
| 6,510,417 B1 * | 1/2003 | Woods et al. | 704/275 |
| 6,658,093 B1 * | 12/2003 | Langseth et al. | 379/88.17 |
| 6,687,341 B1 * | 2/2004 | Koch et al. | 379/88.17 |

* cited by examiner

MAPPING AN INTERNET DOCUMENT TO BE ACCESSED OVER A TELEPHONE SYSTEM

BACKGROUND OF THE INVENTION

1. Related Applications

This application is a continuation-in-part of U.S. patent application Ser. No. 09/464,989, entitled "Voice Interface for Electronic Documents," filed Dec. 16, 1999. This application also claims the benefit of U.S. Provisional Patent Application Ser. No. 60/263,003, entitled "Choosit/User Defined Mapping," filed Jan. 19, 2001. The foregoing patent applications are incorporated herein by reference.

2. The Field of the Invention

The present invention relates to methods and systems for enabling a user to map content of an electronic document so that the information can be accessed from an audio interface. More particularly, the present invention relates to methods and systems for enabling a user to identify and map regions of electronic documents containing text and links so that an audio representation of text located within selected regions and links can be easily accessed over a telephone system.

3. The Prior State of the Art

In recent years, the Internet has become an indispensable source of information for millions of people in their professional and private lives. For example, the Internet is used for email, banking, investing, shopping, news, entertainment, corporate networking, and social interaction. Not too many years ago, however, sharing information over the Internet was principally the domain of academia and scientists. At the time, the Internet was difficult to navigate and essential computer hardware was prohibitively expensive. However, the advent of user-friendly hypertext navigation and the World Wide Web ("Web"), in conjunction with modestly priced and increasingly powerful personal computers, has propelled the Internet to the forefront of public attention, making it the indispensable source of information that it is today.

Like the Internet, the use of portable telephones (e.g. cellular and digital telephones) has experienced tremendous growth in recent years. Initially, however, portable telephones were not widely used because of problems that included providing coverage beyond major metropolitan areas, the expense of purchasing a portable telephone device, the expense of airtime for use, and for some people, because portable telephone devices were originally too big to make them convenient. As a result, portable telephones were mostly used only for vital business concerns rather than for personal matters. Over the past few years, however, portable telephones have become increasingly more sophisticated, compact, and affordable. As a result, portable telephone use has dramatically increased, and for many people, it is now a primary means of communication.

The growing dependence on increasingly intelligent portable telephones, together with the increasing dependence on the Internet as a source of information has created the framework for the inevitable convergence of portable telephone use and the Internet. The ability to access the Internet from a portable telephone is particularly beneficial for enabling remote and mobile access to the Internet. The use of portable computers is one alternative for enabling a user to access the Internet from a mobile or remote location. However, this is not a practical solution for many people who cannot afford a portable computer. They also are not nearly as portable as cellular and digital telephones. For instance, portable telephones in general are smaller, less expensive and more plentiful than portable computers and their battery life generally exceeds that of a portable computer. Furthermore, portable telephones, unlike portable computers, can be used hands-free, while performing other tasks, such as driving an automobile. Accordingly, it is desirable to enable Internet access from portable telephone devices.

One unfortunate problem, however, is that portable telephones do not interface well with the Internet. In particular, hypertext navigation of the Web is a two-dimensional and visually oriented activity, which makes a computer with a relatively large screen an obvious choice for access. A large screen makes it possible for a user to visually inspect the layout of a document and to quickly find the information that he or she wants to read. This is not possible, however, with a portable telephone because portable telephones are very small and compact and have only a very small display screen, if any at all. This makes it impractical, or impossible, to display a Web page on a portable telephone device in a way that is conducive to user-friendly navigation of the Web.

One area that may be particularly well-served by telephone access to the Internet is the personal home page market, as it is becoming increasingly popular for content providers, such as Yahoo!, to offer personal Web home pages that enable a user to compile various desired content into one location. For example, a user may chose to have current data regarding various financial markets, weather, sports stories, headlines, technology, calendaring, contacts, entertainment, travel, reference, etc., appear on a single personal home page. By providing a single, convenient source of diverse information, these personal home pages are highly attractive because, after requiring an initial investment of set up time, they cut down the total amount of time a user would otherwise have to spend to find desired information on a reoccurring basis.

A convenient way to access the Internet by telephone would be useful for anyone who does not have constant access to a networked personal computer. It would also be particularly beneficial to provide an effective audio interface to the Internet for enabling the visually impaired to access the Internet from a portable telephone device that does not have to be attached to Braille machinery.

To overcome the visual display limitations associated with portable telephone device, techniques have been developed that enable a user to access audio representations of Internet content. This is accomplished in one of two general ways, as illustrated in FIGS. 1 and 2. Either a Web page is modified to enable direct audio access from that page, or alternatively, text-to-speech software is used to dictate information from a static translation of an existing Web page.

The prior art solutions, however, are inherently incompatible with the two dimensional format in which visual information is presented. In particular, audio is presented in a linear format, as a function of time. This makes it very difficult for a user to navigate through undesired information to find the information that is desired. Furthermore, it is difficult to impossible for a user to quickly scan an entire Web page for a desired link or for desired content when the Web page is dictated to the user. The sequential format, in which audio is presented, makes navigation of the Internet with an audio interface a very time consuming activity.

FIGS. 1 and 2 show the two general prior art approaches for accessing the Internet with an audio interface. The first approach, designated as 100, in FIG. 1, illustrates a source 110 of electronic content that is accessible through telephone 120. The content in source 110 is written in a markup language specifically designed for enabling audio output through an audio interface. For this approach to work with existing Web pages, it is necessary, however, that existing Web pages be translated into a suitable Voice eXtensible Markup Language (VXML), such as Motorola's VoxML, which includes explicit elements or tags for enabling voice interaction. Requiring explicit voice elements, however, presents a serious drawback, namely, it does not provide a means for accessing content that does not include VXML voice elements. Thus, VoxML fails to provide access to the wealth of content already available on the Web, written mostly in HyperText Markup Language ("HTML"). In other words, to provide full Web access, the entire content of the Web would need to be rewritten to include explicit voice tags of a VXML. The difficulty of accomplishing this task is further compounded by the fact that because there are several existing VXMLs, and more potentially to be developed, it is unclear which VXML should be used or will ultimately be adopted by the industry.

FIG. 2 shows another prior art approach, designated as 200, for enabling a user to access the Internet using an audio interface. As shown, HTML source 210, represents existing Web content that can be accessed through visual and audio interfaces. First, as is well known in the art, visual browser 220 provides a visual interface for monitor 230. Second, static translation 240 provides an audio interface for telephone 250. Static translation 240 is a copy of at least a portion of HTML source 210 that has been manually altered to include audio elements. Someone examines HTML source 210, creates a corresponding audio interface using Text To Speech (TTS) technology, and then stores the audio interface in static translation 240. A user who is interested in accessing HTML source 210 through telephone 250 interacts with the audio interface provided by static translation 240.

The solution of FIG. 2 has the advantage of providing an audio interface without obligating HTML content providers (e.g., providers of HTML source 210) with the responsibility of maintaining an audio interface. However, this approach imposes new problems that may be nearly equal to the one it proposes to solve. Like the approach in FIG. 1, a significant amount of work must be devoted to identifying HTML content of interest and then modifying it. Once the content has been initially modified, each time HTML source 210 changes, corresponding changes must be made to the static translation 240. Naturally, some delay will occur between the time HTML source 210 changes and the corresponding modifications are made to static translation 240. For content that changes unpredictably, frequent and constant updating is a significant burden. Moreover, because of the incredible amount of HTML content available on the Web, only a small portion could practically be modified to include an audio interface and placed in static translation 240, leaving vast Web content completely inaccessible to telephone 250 use.

Another problem for users of each of the foregoing techniques is that an Internet document provider can load the static translation 240, or the VXML source 110 with commercial advertisements that will ultimately be passed on to the user in audio form. This is a problem, not only because a user may find the advertisements to be obnoxious, but also because they can take up precious and sometimes expensive airtime associated with a portable telephone service agreement. Advertisements that are displayed on a graphical browser can be quickly viewed and dismissed, perhaps even unconsciously. However, audio representations of the same advertisements are presented in a time intensive sequential format that cannot be dismissed. This problem, however, is not limited to advertisements. It occurs whenever a user accesses an Internet document that contains some information that the user has no interest in receiving, but which is still included in the VXML source 110 coding or static translation 240 of the HTML code. As a matter of illustration, and not limitation, if a user wishes to access financial data from a Web page containing an index or table of financial data, and the user only wants to access selected portions of the Web page, the user may have to wait and suffer through the dictation of undesired content before the desired content is finally presented.

Accordingly, it would be desirable to enable a user to control how content from an Internet document is presented through an audio interface. Currently, there is no end in sight for the increasing growth of the Internet nor is it likely that the Internet's expanding importance as a source of information will diminish any time soon. Considering the corresponding growth in portable telephone use, providing users with controlled and effective audio access to the Internet would be a great benefit. It would also be beneficial to accomplish this without requiring modification to the existing source of HTML Internet documents.

SUMMARY OF THE INVENTION

The present invention is directed to methods and systems for enabling a user to control how information is presented to the user through an audio interface. One advantage of the present invention is that it allows for user-controlled access to existing Internet, Intranet, and other electronic documents without requiring any modification to the content source of the electronic documents. Furthermore, the present invention allows for a user to control what portions of an electronic document will be accessed from a customized hierarchal structure. It should be appreciated that although certain embodiments of the present invention are described as applying to Internet documents and Web pages in an Internet environment, the invention is not limited to any particular format of electronic information or any particular type of network for accessing electronic content. For example, the methods and systems of the present invention can also be used to map Intranet documents, as well as files stored on personal computers. Similarly, the information that is mapped from the electronic documents can be accessed with any telephone system, not only cellular or wireless telephones.

In one preferred embodiment of the invention, a user creates a user-defined map from a user interface of a computer system that parses and displays Internet documents for mapping. With the user interface, the user selects a region of an Internet document to be mapped and designates whether the selected region corresponds to links or text of the selected region. The user also assigns a name to the designated links or text of the selected region. The present invention allows multiple Internet documents and regions to be mapped within a single user-defined map. It is also possible for a user to nest links and text in a hierarchal order, such that one region is mapped from the link of another mapped region.

A user accesses a voice browser over a telephone to listen to an audio representation of mapped regions of an Internet document based on the user-defined map. Prompts and global commands facilitate a user's navigation through the hierarchy of the user-defined map. When the user makes a selection from the user-defined map, an audio representation of the selected text or links of the Internet document is transmitted over the telephone to the user. If content of a mapped region is modified subsequent to mapping of the region, the updated content of the region is presented to the user.

The invention generally enables a user to control how content of an Internet document is presented to the user through an audio interface, according to a hierarchy that is defined by the user, without requiring any modification to existing content of the Internet document, but accommodating for it.

One benefit of the invention is that it can significantly minimize the time that is required for a user to access content from the Web by enabling a user to eliminate undesired content from the sequential transmission of audio data that is transmitted to the user through an audio interface. Minimizing the time it takes to access content from the Web is also economically beneficial when access to the Web is achieved using a cellular or digital phone with accompanying airtime costs. The invention is also beneficial to users for enabling users to forgo listening to commercials and advertisements from the audio content that is received. The invention is also beneficial for facilitating navigation of the Web over a telephone, by enabling a user to control how content is categorized so that the user can know exactly where to access the information that is desired.

These and other objects, features, and advantages of the present invention will become more fully apparent from the following description and appended claims, or may be learned by practicing the invention as set forth below.

BRIEF DESCRIPTION OF THE DRAWINGS

A more extensive description of the present invention, including the above-recited features, advantages, and objects, will be rendered with reference to the specific embodiments that are illustrated in the appended drawings. Because these drawings depict only exemplary embodiments, the drawings should not be construed as imposing any limitation on the present invention's scope. As such, the present invention will be described and explained with additional specificity and detail through use of the accompanying drawings in which.

DETAILED DESCRIPTION OF THE PREFERRED EMBODIMENTS

Figure 1:
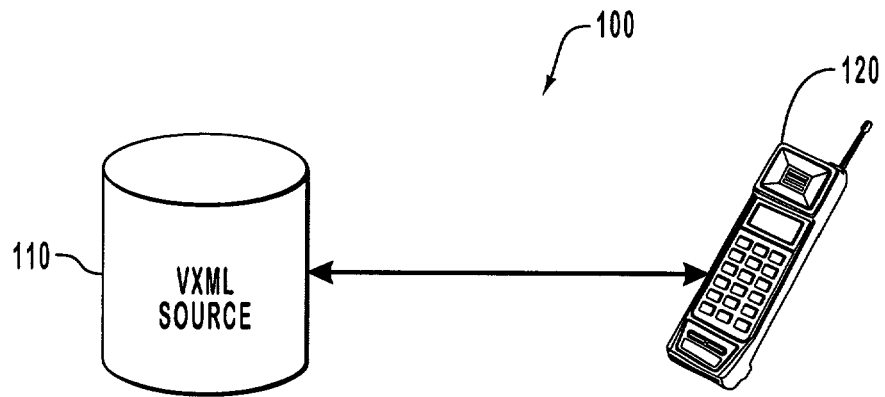
FIG. 1 is a block diagram showing a prior art solution for providing a voice interface to electronic content.
Figure 2:
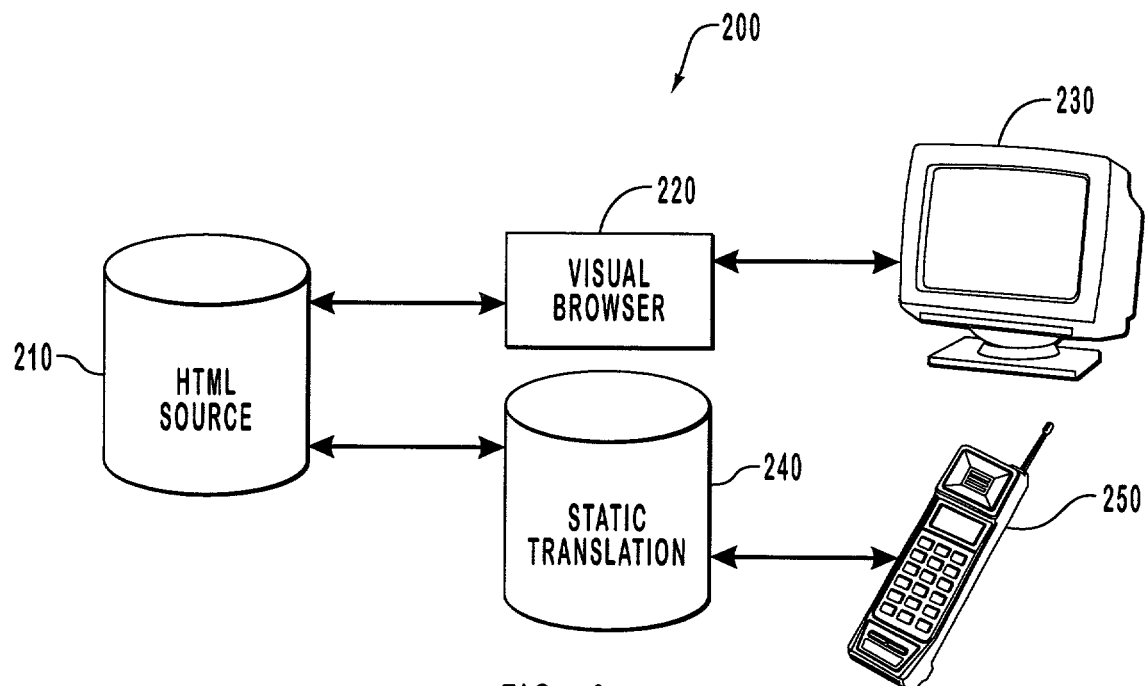
FIG. 2 is a block diagram showing another prior art solution for providing a voice interface to electronic content.

The present invention is directed to methods and systems for enabling a user to define how an audio representation of electronic content is presented to the user through an audio interface. In particular, the present invention enables a user to control what portions of an electronic document will be presented to the user over a telephone system. More particularly, the present invention enables a user to create a user-defined map that includes a customized hierarchy of categories and mapped regions corresponding to Internet documents that can be retrieved by the user over a telephone to access Internet content corresponding to the user-defined map.

In one preferred embodiment, the invention enables a user to create a user-defined map from a user interface of a computer system that parses and displays Internet documents for mapping. With the user interface, the user selects and names a region of an Internet document to be mapped and designates whether the selected region corresponds to links or text of the selected region. Multiple Internet documents and regions can be mapped within a single user-defined map. It is also possible for a user-defined map to include mapped regions that are nested, such that one region is mapped from the link of another mapped region.

A user accesses an audio representation of mapped regions of an Internet document based on the user-defined map with a voice browser over a telephone system. Prompts and global commands facilitate navigation through the user-defined map. When a user makes a selection to access desired content, an audio representation of the selected text or links is transmitted over the telephone to the user. If content of a mapped region is modified after the region is mapped, the modified content is identified and presented to the user.

One particular benefit of the embodiment just described, is that it enables a user to control how content of an Internet document is presented to the user over an audio interface without requiring modification to the Internet document, but while accommodating for it.

It should be appreciated, however, that the invention is not limited to mapping and accessing Internet documents. In particular, the methods and systems of the present invention can also be used to map and access Intranet documents, files stored on personal computers, and cached copies of files stored in storage medium.

Embodiments of the invention, as described herein, may comprise a special purpose or general-purpose computer comprising various computer hardware. Embodiments may also include computer-readable media having computer-executable instructions or data structures stored thereon. Such computer-readable media can be any available media that can be accessed by a general-purpose or special-purpose computer. By way of example, and not limitation, such computer-readable media can comprise RAM, ROM, EEPROM, CD-ROM or other optical disk storage, magnetic disk storage or other magnetic storage devices, or any other medium which can be used to store the desired executable instructions or data structures and which can be accessed by a general-purpose or special-purpose computer.

When information is transferred or provided over a network or other communications connection to a computer, the computer properly views the connection as a computer-readable medium. Thus, such a connection is also properly termed a computer-readable medium. Combinations of the above should also be included within the scope of computer-readable media. Computer-executable instructions comprise, for example, instructions and data which cause a general-purpose computer, special-purpose computer, or special-purpose processing device to perform a certain function or group of functions. The computer-executable instructions and associated data structures represent an example of program code means for executing the steps of the invention disclosed herein.

The invention will be described in the general context of computer-executable instructions, such as program modules, being executed by a computer. Generally, program modules include routines, programs, objects, components, data structures, or the like that perform particular tasks or implement particular abstract data types. Moreover, those skilled in the art will appreciate that the invention may be practiced with other computer system configurations, including hand-held devices, multi-processor systems, microprocessor-based or programmable consumer electronics, network PCs, mini-computers, mainframe computers, and the like. The invention may also be practiced in distributed computing environments where tasks are performed by remote processing devices that are linked through a communications network. In a distributed computing environment, program modules may be located in both local and remote memory storage devices.

Figure 3:
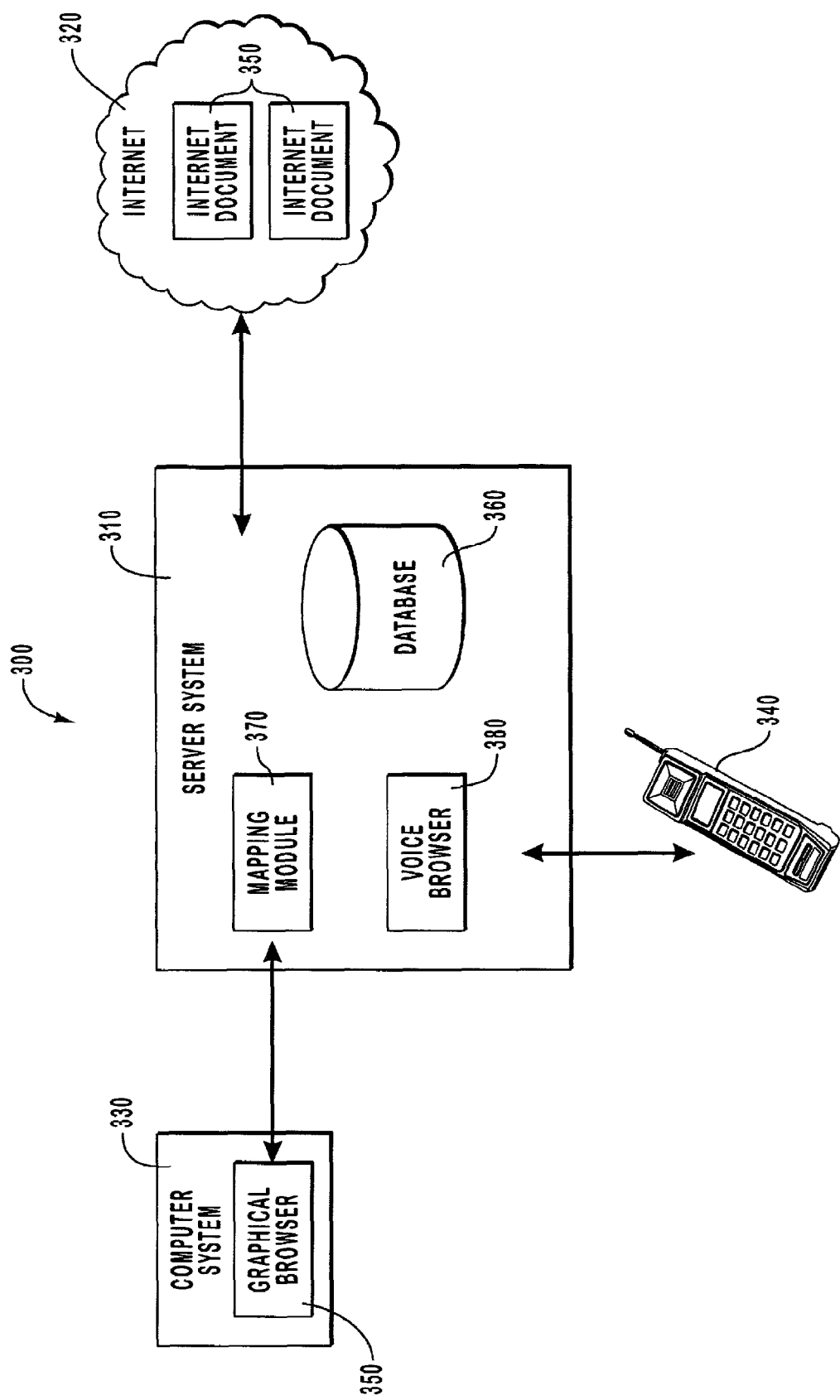
FIG. 3 is a block diagram illustrating one suitable environment for enabling a user to map an Internet document to control how text and links of the Internet document will be presented to the user over a telephone system, including a telephone system, the Internet, a computer system having a graphical browser, and a server system having a mapping module, a voice browser, and a database.

Turning now to FIG. 3, one suitable environment 300 for practicing the invention is illustrated. As shown, a server system 310 is connected to the Internet 320, a computer system 330, and a telephone system 340. The Internet is shown to include Internet documents 350, which should generally be construed to include any Internet document comprising electronic content. One skilled in the art will recognize an HTML source document as one example of electronic content that is common to the Internet. It should also be appreciated that the invention can be practiced with Internet documents comprising other types of electronic content. By way of example and not limitation, other types of electronic content include documents encoded in eXtensible Markup Language (XML) and Voice eXtensible Markup Language (VXML). It should further be appreciated that the invention is not limited in its application to documents located on the Internet, but can generally be practiced on most types of network data and content that can be accessed from a browser.

In one embodiment, graphical browser 350 comprises a user interface that performs the acts that enable a user to map Internet documents 350 according to the invention. It should be appreciated that graphical browser 350 can be operated in connection with a common visual browser, such as Microsoft's Internet Explorer and Netscape's Navigator, which are both well known in the art. According to the current embodiment, graphical browser 350 initially retrieves or receives Internet documents 350 according to user input. Then, according to user input, graphical browser 350 maps selected regions from the Internet documents 350 to create a user-defined map and subsequently transmits the user-defined map to database 360 of the server system 310. Although database 360 is shown and described as being included within server system 310, it should be appreciated that the database 360 can also be located at a remote location.

According to another embodiment, graphical browser 350 comprises a user interface that operates only as a proxy for enabling a user to map Internet documents 350 with mapping module 370. According to this embodiment, all acts that are required for creating a user-defined map are performed at server system 310 by mapping module 370 upon receiving the required user input from graphical browser 350.

Figure 4:
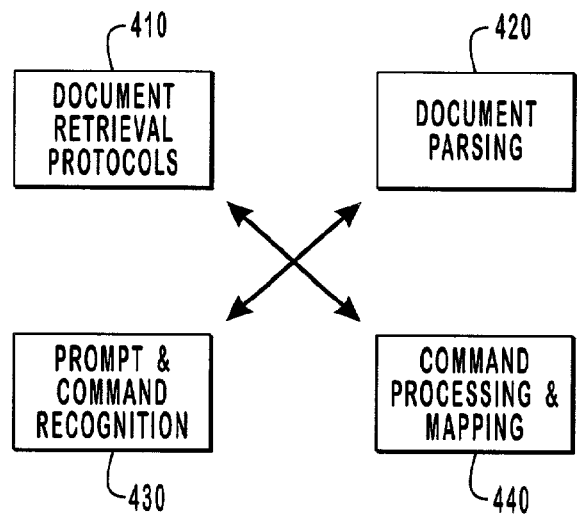
FIG. 4 is a block diagram showing increased detail of the components that make up the present invention associated with the mapping module and graphical browser.

FIG. 4 shows some of the basic components that make up mapping module 370. Document retrieval protocols 410 request and retrieve electronic content that is displayed on the user interface. Document retrieval protocols 410 are well known in the art of accessing electronic content, especially in the context of Internet documents. When a file from an Intranet or personal computer is mapped using the methods and systems of the invention, document retrieval protocols 410 preferably access and retrieve a cached copy of the file from an Intranet database. This is preferred over accessing the file directly from a computer harddrive because the computer may be periodically turned off, whereas the Intranet database can be accessed at almost any time.

Document parsing 420 receives electronic content and identifies any text and links included within the electronic content and is an example of processor means for parsing electronic documents. Links are content elements that lead to other locations in the same document or to other documents entirely. HTML links, for example, create locations within a document's visual representation that may be selected to further explore the link's subject, such a defining a word or leading to related material.

Prompt & command recognition 430 performs the acts that are necessary to communicate with a user and to receive user input that defines how electronic content of an Internet document is to be mapped. There are numerous prompts that the mapping module can present to a user, such as "What is the address (URL) of the site you want to map?", "Please enter a name for this bookmark", and "Do you want to add text or links from this page?" These and other prompts, which can be displayed on the user interface according to the invention, will be discussed more thoroughly in reference to FIG. 7.

Command processing & mapping 440 compiles user input to generate a user-defined map and transmits the user-defined map to a database. Command processing & mapping 440 may also perform various general control functions and coordinate the operation of other components.

It should be appreciated that although components 410–440 are described as generally pertaining to mapping module 370, that they may also be incorporated within graphical browser 350 for enabling graphical browser 350 to perform the acts of the invention that are necessary for enabling a user to create a user-defined map of electronic content.

Returning now to FIG. 3, server system 310 also includes voice browser 380. voice browser 380 provides an audio interface for a user to receive audio representations of electronic content contained within regions of Internet documents 350 that correspond to a user-defined map. Voice browser 380 can also operate independently of a user-defined map. It may, for instance, provide audio content from the Web according to automatic mapping systems and methods that are described in U.S. patent application Ser. No. 09/464,989, entitled "Voice Interface for Electronic Documents," filed Dec. 16, 1999, which is incorporated herein by reference. It should also be appreciated that voice browser 340 can be used in conjunction with a visual browser to provide simultaneous visual and audio output to users accessing the Web.

According to the invention, voice browser 380 is accessed by a user through telephone system 340, which is generally defined herein to include any cellular telephone, digital telephone, landline telephone, computer or electronic device having telephone capabilities, and any other type of telephone device that currently exists or that may be developed, and that is capable of interfacing with voice browser 380.

Figure 5:
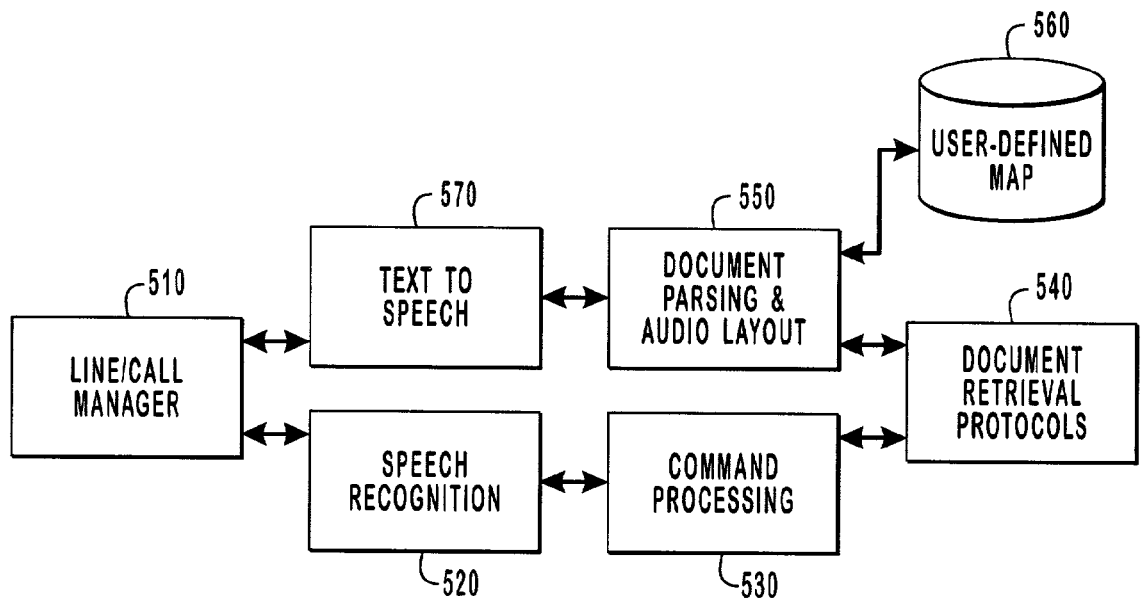
FIG. 5 is a block diagram showing increased detail of the components that make up the present invention associated with the voice browser.

FIG. 5 shows some of the basic components that make up voice browser 380. Line/call manager 510 is responsible for establishing and maintaining telephone connections. Modules for implementing line/call manager 510 are well known in the respective art.

Speech recognition 520 interprets audio or voice data received from user input. Speech recognition 520 can also interpret user input comprising telephone signals, such as Dual Tone Multi-Frequency (DTMF) signals. Speech recognition 520 is an example of processor means for receiving a command from a user. Modules for implementing speech recognition 520 are well known in the respective art.

Command processing 530 executes user requests, performs various general control functions, and coordinates the operation of other components.

Document retrieval protocols 540 request and receive electronic content of interest and are examples of processor means for obtaining electronic documents and for following links. Document retrieval protocols 540 are well known in the art of accessing electronic content, especially in the context of HTML documents.

Document parsing and audio layout 540 receives electronic content and identifies any text and links included within the electronic content and is one example of processor means for parsing electronic documents. Document parsing and audio layout 540, according to the invention, can also be used to retrieve a user-defined map 560 and to compare it with an Internet document to determine what text and links of the Internet document are included within the mapped region of the user-defined map. This can also be accomplished by the components of mapping module 370, which are shown and described in reference to FIG. 4. If voice browser 380 is used independent of the user-defined map 560 of the invention, the audio layout portion of 540 organizes certain content of Internet documents into a hierarchy, as an aid to navigation, and is one example of processor means for mapping any text and links identified into one or more categories.

Text to speech module 570 converts text from Internet documents into speech that is transmitted to the user over a telephone system and is an example of processor means for generating an audio representation of electronic content. Text to speech 570 may also include some prerecorded audio content including, for example, frequently used words, links, text, and prompts. Modules for implementing text to speech 570 are well known in the respective arts.

Figure 6:
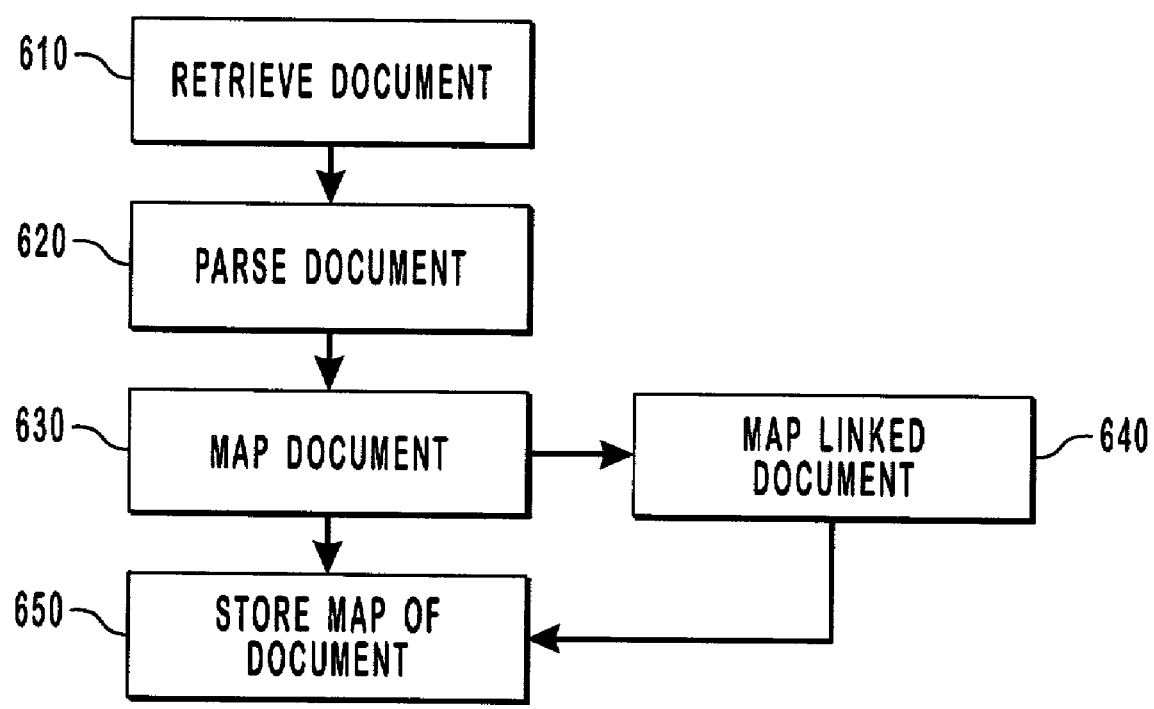
FIG. 6 is a flow chart illustrating an embodiment of the invention for creating a user-defined map.
Figure 7:
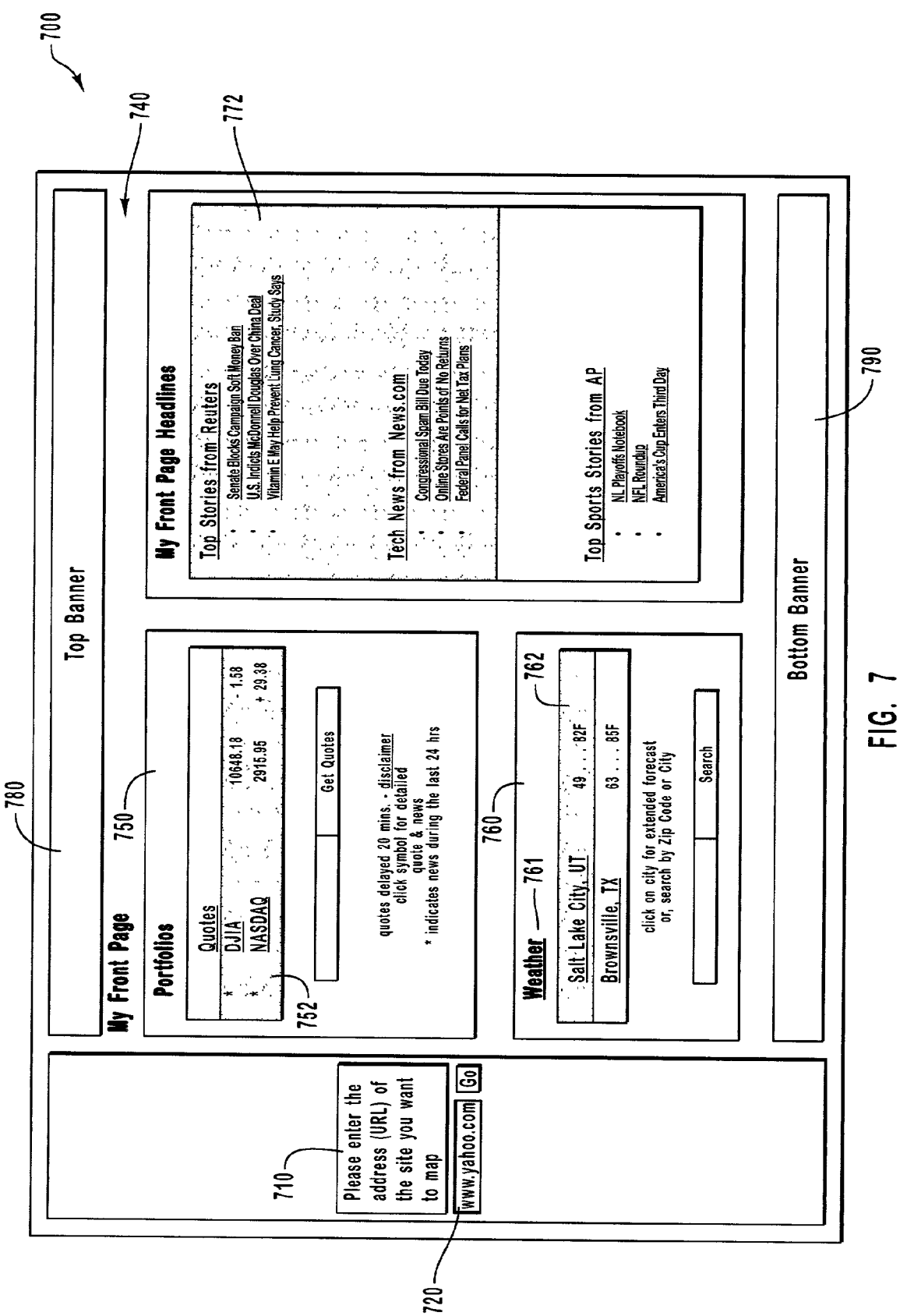
FIG. 7 is an example of electronic content of an Internet document that is displayed on a user interface of the invention, and is used to describe the embodiments of the invention for enabling a user to a map an Internet document to control how text and links of the Internet document will be presented to the user over a telephone system.

One method of the invention for enabling a user to create a user-defined map of an Internet document, or any other type of electronic document, can be accomplished by performing the acts shown in the flow chart of FIG. 6 and will be generally described in reference to FIGS. 6–7.

Figure 9:
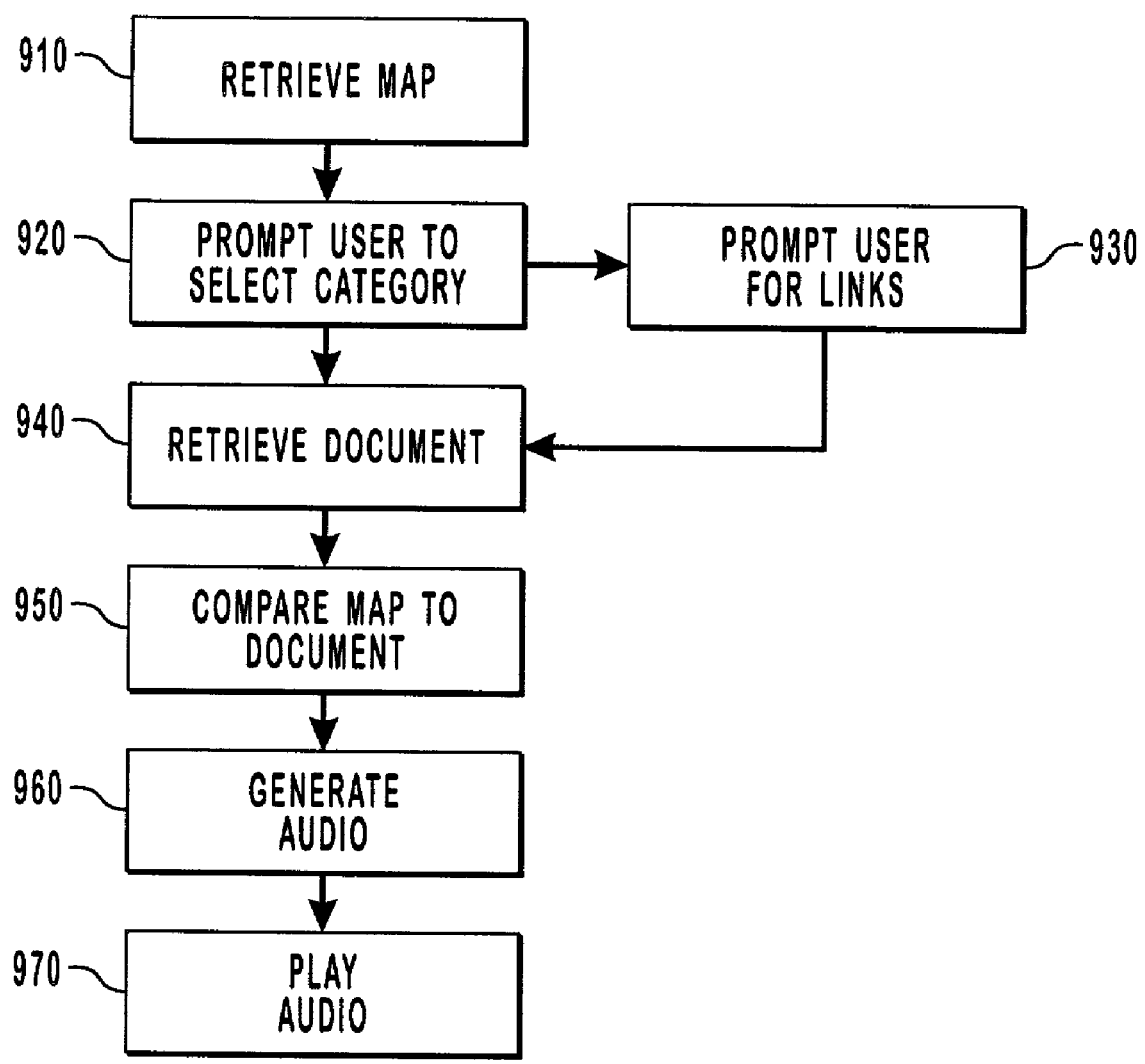
FIG. 9 is a flow chart illustrating an embodiment of the invention for enabling a user to access content from the Internet that corresponds to a user-defined map.

Because each figure number is incorporated into individual references, i.e., reference 610 appears in FIG. 6 and reference 920 appears in FIG. 9, the specific figure number may be inferred and therefore may not be explicitly identified in the discussion that follows. It should also be noted that while the steps of FIG. 6 are shown sequentially, there is no requirement that one step be completed prior to the next step beginning. For example, the act of comparing the user-defined map to the Internet document can occur prior to or subsequent to the act of parsing the document.

In step 610, a particular document is requested and received. To accomplish this, document retrieval protocols 410 may prompt the user to select or request a desired source of information. Once a requested document is received, it can be displayed on display 700 of the user interface. In one embodiment, the prompt "Please enter the address (URL) of the site you want to map" is entered in prompt field 710. A user enters commands and responses to any prompts in response field 720. As shown, a response "www.yahoo.com" has been entered within response field 720. Buttons, such as go button 730 can assist a user in entering responses. Various buttons, may be used to assist the user, including Help, Back, Forward, Yes, No, and Exit buttons. Each of these buttons and their corresponding uses are well recognized in the computer industry. Once a user enters the Uniform Resource Locator (URL) of the site that the user wishes to map and, in one embodiment, selects the go button 730, the requested document 740 corresponding to that URL is received and displayed on display 700.

In one embodiment, requested document 740 includes information in various categories, which is typical of personal Web homepages. The categories of requested document 740 include portfolio category 750, weather category 760, and my front page Headlines category 770.

Having obtained the requested document 740, document parsing 420 parses the content, step 620, to identify any title, any text, any links, and any link names included within the document. A link name is simply the text that forms the link. For example, "weather" 761 is the link name of weather category 760. According to another embodiment, however, document parsing does not occur until the requested document 740 is retrieved and compared to a user-defined map, as described in step 950, of FIG. 9.

FIG. 7 illustrates how requested document 740 may look after it is parsed. As shown, some portions of the requested document 740 are filtered out and ignored. Top banner 780 and bottom banner 790 include a variety of images that are not particularly suitable for voice interaction. Each of the category areas 750–770 may also include content that is ignored and is not displayed, such as graphics. Other unsuitable content that is ignored includes JavaScript, flash objects, and video. If a Web page only contains these type of images then the Web page is not be displayed, but instead an error message of some type is presented to the user.

Once the requested document 740 is parsed, certain text and links included within the document are mapped, step 630. There are a variety of methods for identifying page content that should be mapped and for categorizing the content into a structured hierarchy. Several of these methods are described in U.S. patent application Ser. No. 09/464,989, entitled "Voice Interface for Electronic Documents," filed on Dec. 16, 1999. Mapping can also be accomplished, according to the present invention, by enabling a user to define what content is mapped and how it is organized in a user-defined map.

A user creates a user-defined map of an Internet document, according to step 630 of the invention, by performing the following acts: Selecting a region of the requested document 740 to be mapped; indicating whether text or links of the selected region are to be mapped; and naming the selected region so it can be identified and retrieved by the user at a later time. It should be appreciated that these acts may be performed in any order and may include additional acts, such as naming a bookmark associated with the requested document 740.

As a matter of example and not limitation, the following is given to illustrate how a user might be prompted to map the requested document 740. Initially, the Prompt Field is refreshed and displays the prompt "Bookmark Name." In response, the user enters a name to associate the requested document 740 with a bookmark of the user-defined map. Next, the prompt field 710 is replaced with the prompt "Is there any information here you would like to map?" The user responds by entering "Yes" in the response field 720, or by selecting a Yes button, if one is provided. The prompt field 710 is then replaced with the prompt "Do you want to add text or links from this page?" The user responds by entering either "Text" or "Links" in the response field 720, or by selecting an appropriate button. The user is then prompted to "Select an area of text by clicking and dragging your mouse over the selected text," or to "Select a link or group of links by clicking and dragging your mouse over the group." Once a selected region of the requested document 740 is selected, and associated with either text or links, the user is prompted to "Enter a name for this voicelink." A user can then name the selected region according to personal preferences, which organizes the associated links or text for easy access. After the user enters a name for the voicelink, the set of prompts may be presented again, and may repeat until the user stops the mapping process.

According to step 630, the user can also be presented with options that enable the user to map Web pages that are linked from the requested document 740. For example, when the user is prompted "Do you want to add text or links from this page?," the user may enter or select "No," in which case the user is presented with the prompt "Using the screen on the right follow the link to the page you want to map." The user can then use standard Internet navigation to find a linked page by selecting any of the links that are displayed. The user can then map the linked page according to the process just described. It should be appreciated that this enables a user to organize a hierarchy of nested links that depend from one another.

In one implementation of this embodiment, a user responds to the prompt "Is there any information here you would like to map?" by entering "Yes." In response to the next prompt, "Do you want to add text or links from this page?" the user enters "Links" and subsequently selects region 772 of news category 770, which is highlighted. When prompted to name region 772, the user enters the name "News" in response field 720. The user then proceeds to map region 752 of category portfolios 750, which is highlighted. This region, however, is mapped for text according to user input, and correspondingly named "Portfolios." In like manner, the user maps region 762 of weather category 760 and names the selected region "Weather." The user then terminates the mapping process by entering a command or by selecting an appropriate button.

Figure 8:
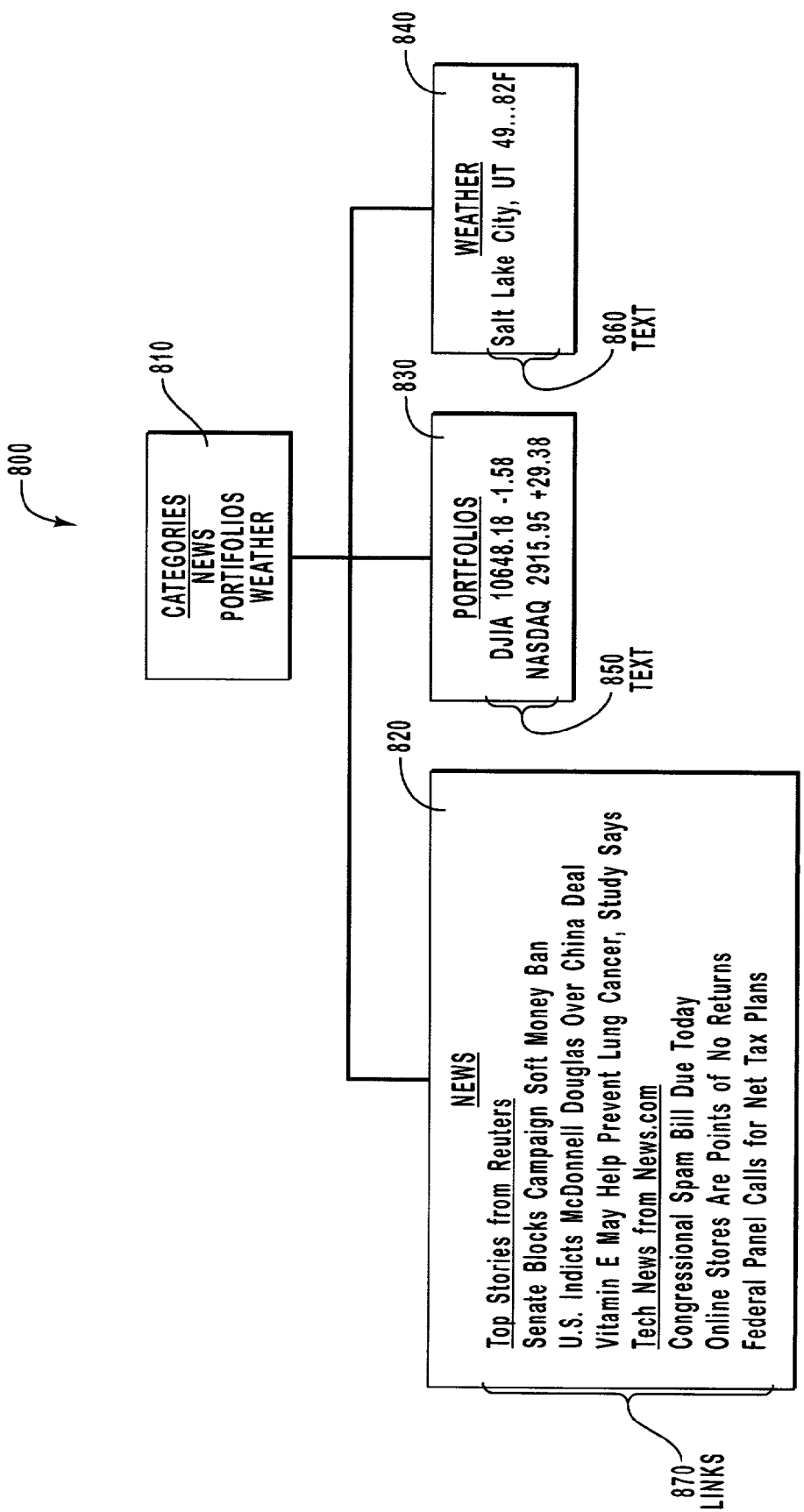
FIG. 8 shows a block diagram that illustrates the hierarchal organization of one embodiment of a user-defined map.

A visual representation of the user-defined map 800 that was created from the example just given is shown in FIG. 8. As shown, the user-defined map 800 contains a hierarchy that includes a menu of categories 810. The next level, corresponding to the menu of categories 810 includes news 820, portfolios 830, and weather 840. Each of these includes text 850, 860 and links 870 that correspond to the regions that were mapped by the user. As shown, the text 850, 860 and links 870 of the categories 820–840 do not include text and links of the requested document 740 that are not located within the mapped regions 752, 762, 772. This is useful because it enables users to selectively omit content from Web pages that they do not want to receive in audio form through an audio interface. This is particularly beneficial when mapping a Web page other than a personal homepage that can be customized by a user to contain only desired content.

According to the example of the present embodiment, the user did not nest or map a Web page that is linked to the requested document 740. It should be appreciated, however, that this is possible, as indicated by step 640. If a user does choose to map a linked Web page to the existing user-defined map 800, then user-defined map 800 would include at least one more level of in its hierarchy. It is also possible for multiple Internet documents to be mapped into a single user-defined map. Multiple documents can be organized by bookmarks or with categories of a user-defined map.

Once the user-defined map is generated, according to step 630 it is stored in database 360 of server system 310 were it can be retrieved and referenced or updated at any time. It should be appreciated that even though the mapping process does require an initial investment of time, it enables a user to quickly access content from the requested document 740 through a user interface on a reoccurring basis, saving overall time. This becomes even more apparent by the following discussion related to how a user accesses content associated with a user-defined map.

As described above, in reference to FIGS. 3 and 5, voice browser 380 enables a user to access the Internet 320 from telephone device 340. One method of the invention for providing a user with controlled access to the Internet 320 is illustrated by the steps or acts in FIG. 9. As shown, the first step 910 is to retrieve the user-defined map, which is accomplished in response to user input, commands or requests that are received by voice browser 380. User input or requests can include spoken words and signals that are generated by pressing keys on a keypad. According to one embodiment, user input includes key words that are spoken, such as "Internet," or "Connect me to the Internet." A user can also be assisted with prompts. Upon receiving user input, speech recognition 540 interprets the command so that it can be processed.

Voice browser 380 next presents the user with an audio representation of the mapped regions of the Interned document based on the user-defined map in a chronological and hierarchal order according to the structure of the user-defined map. This is accomplished, for example, by prompting the user to select a category, step 920. For example, voice browser 380 may present the user with the following audio content: "News" (pause) "Portfolios" Cause) "Weather". Voice browser 380 can also assist the user by providing a prompt such as "Please select one of the following . . . " The user enters a selection by either speaking the selection or entering appropriate keys of the key pad as prompted. According to step 930, if the selected category contains sub-categories, then user is also presented with a prompt to select a sub-category. It should also be appreciated that instead of categories and sub-categories, a user can be presented with prompts related to bookmarks or favorites, of which categories may be a subset, or of which categories may be included.

The act of prompting a user for a category name, step 920, and the act of prompting a user for links or sub-categories, step 940, can also be practiced in connection with Provisional U.S. patent application Ser. No. 60/263,003, entitled "Dynamic Super Menu and Whisper Coach," filed Jan. 19, 2001, in which dynamic menuing is generated on the fly. This would enable the Voice Browser to present prompts with menu numbers that correspond with the categories, sub-categories, bookmarks, favorites, links, and other elements of the user-defined map. This would enable a user to enter easy to remember numbers instead of phrases or other words that are not as easy to remember or as easy to enter using a keypad. This would be particularly useful when user input comprises long words and phrases.

Once a designated category or sub-category is selected then the Internet document corresponding to the information that was selected is retrieved, step 940, and compared to the user-defined map, step 950. This is necessary to determine what content from the Internet document will be transmitted to the user. To accurately compare the Internet document to the user-defined map, document parsing 420 parses the Internet document to identify any text and any links included in the Internet document.

As a matter of example and not limitation, a user in communication with Voice Browser 380 selects "Weather" as the category from prompts that are presented to the user over the telephone. Document retrieval protocols 560 retrieves the requested document 740 and subsequently compares the user-defined map 800 to the requested document 740 to determine what content will be transmitted back to the user. If the content corresponding to the "Weather" is the same as the content that was originally mapped in region 762, then the user will receive an audio representation of the exact text that was mapped, step 970. An audio representation of the content that corresponds to mapped region 762 is generated by text to speech 520, and is subsequently played or transmitted to the user, step 970. In the present example, the user hears an audio representation of "Salt Lake City, Utah 49 . . . 82F."

Figure 10A:
FIG. 10A is an example of electronic content of an Internet document that corresponds to a mapped region of a user-defined map.
Figure 10B:
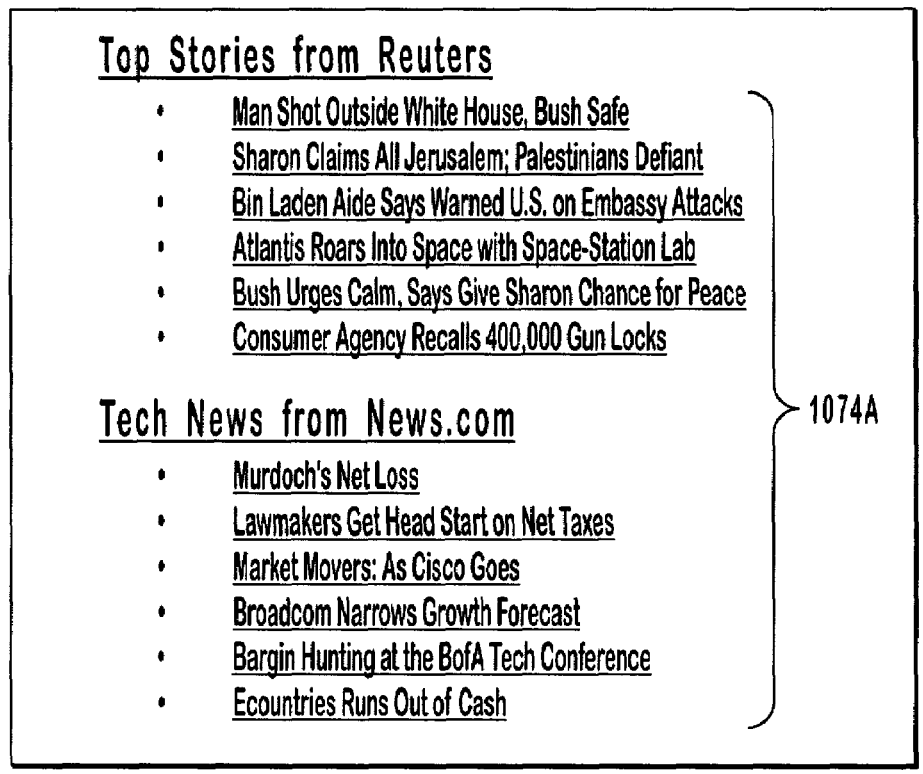
FIG. 10B is an example of modified electronic content of the Internet document of FIG. 10A that corresponds to the region of a user-defined map of FIG. 10A.

If the content corresponding to the mapped region has been modified, however, then the updated content of the mapped region is transmitted to the user. The following example is given as a matter of illustration, and not limitation, to show how the invention accommodates modification of content in the mapped region of a Web document. In this embodiment, the news stories have changed since they were first mapped. It is common for news stories and headlines to change daily. According to this embodiment, a user selects "News" over telephone 340. Document retrieval protocols 560 retrieves the requested document 740 and compares it to mapped region 772 of news category 820. FIG. 10A illustrates mapped region 1072 and corresponding links 1074, as originally mapped. FIG. 10B shows mapped region 1072A and associated links 1074A that correspond to the new news and an updated version of requested document 740, not shown. To accommodate the greater number of news links 1074A, the updated region 1072A is spatially larger than the original mapped region 1072.

Algorithms can be used to enable document retrieval protocols 560 to determine where a mapped region begins and ends so that the mapped region can expand or shrink to accommodate modifications to content of an Internet document. Otherwise, if a mapped region were limited to spatial constraints during mapping, then desired content could be bumped out of a mapped region or undesired content might be added to a region whenever a Web page is modified. The present invention uses pointers, matching systems and algorithms to determine where the beginning and ending of a mapped region is. One skilled in the art will recognize that there are various suitable algorithms that can be used in connection with the present invention. As a matter of example, one suitable algorithm comprises the Diff algorithm, or the UNIX Diff algorithm.

It should be appreciated that the invention enables a mapped region to expand or shrink while preserving the integrity of what is mapped between the start and end of the regional boundaries, or tags. This is particularly useful when mapping a cached copy of a file from a personal computer or an Intranet document. In particular, the cached copy of the file that is mapped can be updated by a mirroring process, when backing up the files of the computer or Intranet system, while preserving the integrity of the user-defined map of the cached copy. This generally enables a user to get what is desired and only what is desired from a mapped document, even when the document undergoes changes. It should be appreciated that this feature of the invention also extends the life of a user-defined map, so that it does not have to be updated every time a mapped Web page or electronic document is modified. Periodically, however, a user may be required to update the user-defined map if wholesale changes are made to the mapped document that cannot be accommodated for.

If voice browser 380 is unable to perform the acts as defined for any reason, such as when selected regions or Web documents associated with a user-defined map become obsolete, then voice browser 380 can default to an automatic system of parsing and mapping Internet documents to enable the user to navigate the Web according to the methods and systems described in U.S. patent application Ser. No. 09/464,989, entitled "Voice Interface for Electronic Documents," filed Dec. 16, 1999.

According to the present example in which the "News" is selected, but the content within the associated region 1072 has been modified, the user is presented with an audio representation of the links 1074A contained in the updated region 1072A. Because region 1072A comprises links 1074A, the user is also prompted to select one of the links 1074A. Upon selecting one of the links 1074A, the text of the Web page associated with the selected link is read to the user. At any time a user can navigate back and forth between the different hierarchal levels of the user-defined map 800 by entering appropriate commands.

Even though the acts of FIG. 9 are shown in a particular order, this should not be construed as a limitation, but only as an example of one suitable order for performing the acts. The method shown may also incorporate additional acts. For instance, during step 950, when the user-defined map is compared to the retrieved Internet document, the act of parsing the retrieved Internet document may also be performed to facilitate the performance of step 950.

The invention, as it has been described herein, generally enables a user to control how content of an Internet document is presented to the user through an audio interface, according to a hierarchy that is defined by the user, without requiring any modification to existing content of Internet document, but while accommodating for it. The invention also enables a user to access mapped regions of an Internet document according to a user-defined map, even when content within the region is modified after being mapped by the user.

It should be appreciated that these benefits of the invention are advantages over the prior art. In particular, the invention can significantly minimize the time that is currently required for a user access content from the Internet, Intranet, or personal computer by enabling a user to eliminate undesired content from the transmission of audio data that is transmitted to the user. The invention also provides a user with more control over how and what content is accessed from the Internet, Intranet, or personal computer through an audio interface by enabling a user to control how content is mapped. By allowing a user to categorize content in a user-defined map, the invention also enables a user to know exactly where to access the information that is desired so that it can be accessed in a quick and convenient manner.

The present invention may be embodied in other forms without departing from its spirit or essential characteristics. As properly understood, the preceding description of specific embodiments is illustrative only and in no way restrictive. For example, embodiments that make specific reference to mapping and accessing Internet documents should not be construed to limit the invention to mapping any specific format of electronic document or any particular means of accessing electronic content, once mapped. The scope of the invention is, therefore, indicated by the appended claims as follows.

The invention claimed is:

1. In a network that includes a server system connected to the Internet, and a computer system and a telephone system that communicate with the server system, a method for creating a user-defined map of an Internet document to control how text and links of the Internet document will be presented to the user over the telephone system, the method comprising:
in response to a request received from a user of the computer system, receiving an Internet document from a content source without modifying the Internet document at the content source;
graphically displaying the Internet document to a user;
receiving input from the user selecting a region of the Internet document, the region including at least one of text and links;
receiving a name from a user that associates the selected region of the Internet document with a category in the user-defined map;
mapping the selected region to the user-defined map as the category in a menu of categories, the category corresponding to the selected region; and
without modifying the Internet document at the content source, storing the user-defined map such that the user can later access the Internet document from the content source using an audio interface in which the user-defined map defines the portions of the Internet document that are to be presented to the user over the audio interface by comparing the user-defined map with the Internet document.

2. A method as defined in claim 1, further comprising generating an audio representation of any text and any links contained in the Internet document that correspond to a particular category of the user-defined map in response to a user request for the particular category entered at the telephone system.

3. A method as defined in claim 2, transmitting said audio representation to the user over the telephone system in response to a user request entered at the telephone system.

4. A method as defined in claim 2, wherein prior to generating an audio representation of any text and any links, parsing the Internet document to identify any text and any links included in selected regions of the Internet document that correspond to categories in the user-defined map.

5. A method as defined in claim 1, wherein said Internet document comprises HTML content.

6. A method as defined in claim 1, wherein the at least one of text and links comprises a Uniform Resource Locator.

7. A method as defined in claim 1, further comprising displaying the Internet document on a user interface associated with the computer system.

8. A method as defined in claim 1, further comprising prompting the user for the name and for the selected region.

9. A method as defined in claim 1, wherein receiving input from the user selecting the region of the Internet document further comprises highlighting the selected region of the Internet document.

10. A method as defined in claim 9, wherein the selected region includes links to be mapped and wherein at least one link of the links to be mapped is associated with at least one other Internet document.

11. A method as defined in claim 10, further comprising presenting the user with a prompt at the telephone system to select the at least one link.

12. A method as defined in claim 11, further comprising selecting the at least one link in response to the prompt at the telephone system to select the at least one link.

13. A method as defined in claim 12, further comprising transmitting an audio representation of text of the at least one other Internet document to the user over the telephone system.

14. A method as defined in claim 1, further comprising:
selecting a second region of the Internet document to be mapped;
mapping at least one of text and links in the second region to the user-defined map; and
receiving a second name that identifies a second category in the user-defined map, the second category associated with the second region.

15. A method as defined in claim 14, wherein the second region comprises a region of at least one other Internet document.

16. A method as defined in claim 15, wherein the at least one other Internet document corresponds to at least one link associated with the second region.

17. In a network that includes a server system connected to the Internet, and a computer system and a telephone system that communicate with the server system, a method performed at the server system for enabling a user to access an Internet document with the telephone system, such that content of the Internet document is presented to the user according to a user-defined map of the Internet document, the method comprising:
receiving an access request for the Internet document from a user using a telephone system;
accessing a user-defined map that controls which regions of the Internet document are presented to the user without modifying the Internet document, the user-defined map comprising:
one or more categories, each category associated with a particular region of the Internet document; and
at least one of links and text in each category, the at least one of links and text in each category corresponding to selection regions of the Internet document;
prompting the user over the telephone system to select a particular category of the user-defined map;
retrieving the Internet document and comparing the Internet document to the user-defined map to identify the portions of the Internet document that are to be presented to the user;
generating an audio representation of the portions of the Internet document that are to be presented to the user; and transmitting said audio representation to the user over the telephone system.

18. A method as defined in claim 17, further comprising generating the audio representation using a text to speech module at the server system.

19. A method as defined in claim 17, wherein the Internet document comprises HTML content.

20. A method as defined in claim 17, wherein the Internet document comprises Voice eXtensible Markup Language content.

21. A method as defined in claim 17, wherein one of text and links of the at least one region has been modified after the user-defined map was created.

22. A method as defined in claim 21, wherein the audio representation includes said one of text and links of the at least one region that has been modified after the user-defined map was created.

23. A method as defined in claim 17, further comprising transmitting the user-defined map to the server system.

24. In the mapping module of a server system that communicates with a telephone system and a computer system, a method for enabling a user to a map an Internet document to identify which text and links of the Internet document will be presented to the user over the telephone system, the method comprising:
retrieving an Internet document in response to a first user input received from the computer system, wherein the Internet document comprises at least one of text and links;
creating a user-defined map that identifies which regions of the Internet document are presented to a user over a telephone system without modifying of the Internet document by performing:
receiving a second user input from the computer system, the second user input selecting a region of the Internet document to be mapped;
receiving a third user input from the computer system, the third user input causing the mapping module to map one of either text and links of the selected region to a category of the user-defined map; and
receiving a fourth user input from the computer system, the fourth user input causing the mapping module to associate a name with the selected region of the Internet document and the category in the user-defined map; and
storing a copy of the user-defined map at a database that is associated with the server system, wherein a comparison of the user-defined map and the Internet document determines the content of the Internet document that is to be presented to the user over the telephone system.

25. A method as defined by claim 24, wherein the Internet document comprises HTML content.

26. A method as defined by claim 24, further comprising, prior to creating the user-defined map, transmitting the Internet document to the computer system, wherein the Internet document is displayed on a user interface.

27. A method as defined in claim 24, further comprising generating an audio representation of only those text and links contained in the Internet document that are defined in the user-defined map in response to a user input entered at the telephone system.

28. A method as defined in claim 27, further comprising transmitting said audio representation to the user over the telephone system in response to a second user input entered at the telephone system.

29. A method as defined in claim 24, further comprising prompting the user for the first user input, second user input, third user input, and fourth user input.

30. A method as defined in claim 27, wherein prior to generating an audio representation of said text and links, parsing the Internet document to identify said text and links included in the Internet document that are defined in the user-defined map.

31. A computer program product for implementing, in a computer system that communicates with an Internet-connected server system, the server system communicating with a telephone system, a method mapping an Internet document to control how text and links of the Internet document will be presented to the user over the telephone system, the computer program product comprising:
a computer-readable medium carrying computer-executable instructions for implementing the method, the computer-executable instructions comprising:
program code means for receiving an Internet document in response to a first user input received from the computer system, wherein the Internet document comprises at least one of text and links;
program code means for creating a user-defined map that controls which portions of the Internet document are presented to user over a telephone system without modifying of the Internet document, wherein creating a user-defined map comprises program code means for:
receiving a second user input that selects a region of the Internet document to be mapped to the user-defined map as a category, wherein unselected regions of the Internet document are omitted from the user-defined map;
receiving a third user input that causes one of either text and links of the selected region to be mapped into the category of the user-defined map; and
receiving a fourth user input that associates a name with the selected region and the category; and
program code means for transmitting a copy of a user-defined map to the server system, wherein unselected regions of the Internet document are omitted and only those text and links defined in the user-defined map based on a comparison between the user-defined map and the Internet document are included when transmitting an audio representation of the Internet document to a user over the telephone system.

32. A computer program product as defined in claim 31, where in the computer-readable medium further comprises program code means for prompting the user for first user input, second user input, third user input, and forth user input.

33. A computer program product as defined in claim 31, where in the computer-readable medium further comprises program code means for displaying the Internet document on a user interface.

* * * * *